(12) United States Patent
Durham et al.

(10) Patent No.: US 6,601,082 B1
(45) Date of Patent: Jul. 29, 2003

(54) SYSTEM AND METHOD FOR MANAGING ACTIONS PROVIDED BY A NETWORK USING A POLICY TREE

(75) Inventors: David M. Durham, Hillsboro, OR (US); Russell J. Fenger, Beaverton, OR (US); Rajendra S. Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/365,101

(22) Filed: Jul. 30, 1999

(51) Int. Cl.[7] .......................... G06F 9/00; G06F 15/173
(52) U.S. Cl. ........................ 709/100; 709/223
(58) Field of Search ............................. 705/8; 709/102, 709/223, 100; 345/440; 700/100

(56) References Cited

U.S. PATENT DOCUMENTS 5,680,530 A  * 10/1997 Selfridge et al. ........... 345/440
6,003,061 A  * 12/1999 Jones et al. ................. 709/102
6,308,163 B1 * 10/2001 Du et al. ........................ 705/8
6,321,133 B1 * 11/2001 Smirnov et al. ............ 700/100
6,341,287 B1 *  1/2002 Sziklai et al. .................. 705/8

* cited by examiner

Primary Examiner—Le Hien Luu
(74) Attorney, Agent, or Firm—Kenyon & Kenyon (57) ABSTRACT

A system and method for managing a network using a policy tree which includes a plurality of levels (e.g., two levels, five levels, etc.) is described. When the network receives a request to provide an action to a particular source, the network determines if the action is available as a function of at least one level of the plurality of levels. If the action is available, the network determines if the particular source is authorized to be provided with the action as a function of at least one rule of at least one further level of the plurality of levels. If the particular source is authorized, the network provides the action to the particular source.

29 Claims, 8 Drawing Sheets

SYSTEM AND METHOD FOR MANAGING ACTIONS PROVIDED BY A NETWORK USING A POLICY TREE

FIELD OF THE INVENTION

The present invention relates to a system and method for managing a network.

BACKGROUND OF THE INVENTION

Recent innovations in conventional communication networks (e.g., the Internet and corporate networks) are transforming a network infrastructure from a "dumb, best effort" model into an "intelligent" network. The intelligent network is built around a set of new network services such as Quality of Service, multipoint communication, remote configuration and software distribution, security, and sophisticated directory services. Resulting changes in the use of network resources require major changes in how network resources are managed. In particular, network managers and service providers must be able to monitor and control network resources and services based on policies derived from a variety of criteria such as a user's identity, application type, current traffic conditions, bandwidth requirements, security considerations, time-of-day, and cost.

A conventional method of managing a network resource has a one-level logic structure. Such a structure has a number of constraints for each action requested. For instance, if user A wants to access a network X, the network X would look up user A's profile to see whether user A is authorized for such access. In addition to the authorization information, user A's profile would include other information about his privileges with respect to the network resources.

Conventional management tools use a centralized management console for configuring, monitoring, and controlling the behavior of various network devices in the network. Typically, a single logical console is responsible for a given control domain (e.g., a Windows NTO domain or an administrative domain for routing protocols), and the control domains themselves are organized into a hierarchy for the purpose of scaling to large corporate networks. Such control hierarchies also tend to reflect the organizational hierarchies within an information technology organization.

Network devices, such as switches and routers, are optimized to perform one central task—data forwarding; other tasks are secondary. As a result, these devices provide only minimal support for network management, usually by supplying performance or status data in response to polls from a management console. Thus, in the deployment of policy-based control, it is important to avoid overburdening these devices with complex processing such as policy interpretation or policy-based admission control.

Furthermore, a traffic load on corporate networks spans a wide spectrum of traffic characteristics, and network traffic related to mission-critical applications (e.g., those accessing corporate databases and other services) must compete with other, less-important traffic. The explosion in the use of web-based technologies such as subscription channels, push services, and audio/video streams that do not include congestion avoidance mechanisms, all contribute to significant increases in traffic load. Deployment of internet protocol ("IP") multicast and associated business applications such as distance learning and corporate training adds yet another dimension to the allocation of network resources. Clearly, such unconstrained access to a local area network ("LAN") bandwidth has the potential to saturate most enterprise networks and must be carefully controlled to avoid network bottlenecks. In addition, network communications need to be secure and protected. Furthermore, access to network resources (e.g., servers, files, etc.) must be controlled and protected.

SUMMARY OF THE INVENTION

The present invention relates to a system and method for managing a network using a policy tree that includes a plurality of levels (e.g., two levels, five levels, etc.). The policy tree may be generated/updated by the network and/or an outside system. When the network receives a request for providing an action to a particular source, the network determines if the action is available as a function of at least one level of the plurality of levels. If the action is available, then the network determines if the particular source is authorized to be provided with the action as a function of at least one rule of at least one further level of the plurality of levels. If the particular source is authorized, then the network provides the action to the particular source.

The plurality of levels of the policy may include a first level, a second level, a third level, a fourth level and a fifth level. The first level may be generated as a function of an action type which may be indicative of the action. The second level may be generated as a function of the action and linked to the first level. The third level may be generated as a function of the at least one rule. The fourth level may be generated as a function of at least one condition type of the at least one rule. The fourth level may be linked to the third level. The fifth level may be generated as a function of at least one condition of the at least one condition type. The fifth level may be linked to the fourth level.

BRIEF DESCRIPTION OF THE DRAWINGS

FIG. 4b shows a grouping of elements of the fifth level shown in FIG. 4a.

DETAILED DESCRIPTION

Figure 1A:
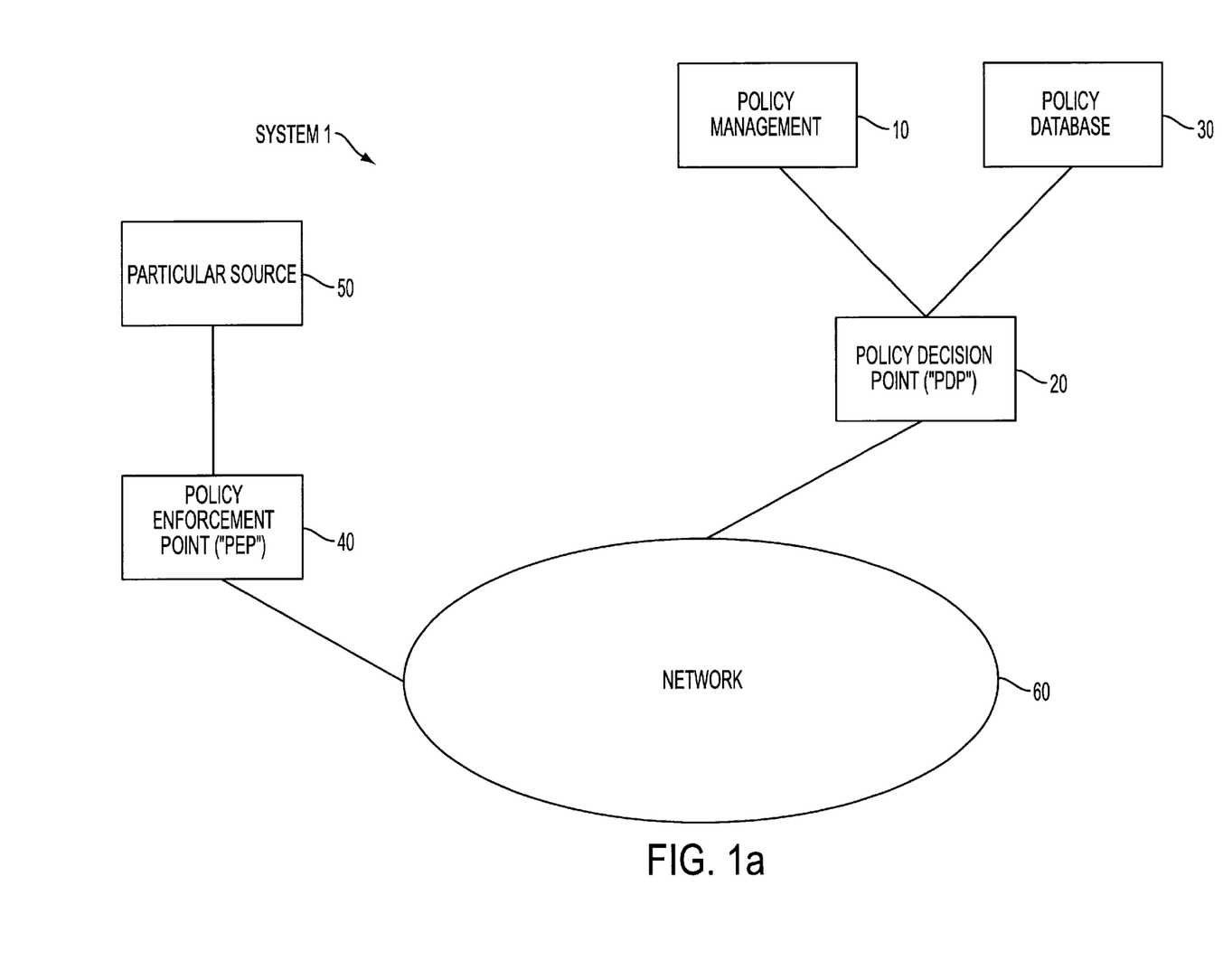
FIG. 1a shows an embodiment of a system according to the present invention.

FIG. 1a shows an embodiment of a system 1 according to the present invention which manages a network 60 using a policy tree 100. Network 60 may be, e.g., a local area network, a wide area network, the Internet, an intranet, a virtual network, a wireless network, etc. System 1 may include a policy management device 10 which determines network policies regarding actions to be provided by network 60. The actions may be, e.g., providing physical resources, logical resources, allowances, etc.

System 1 may also include a Policy Decision Point ("PDP") 20 (e.g., a policy server) which is coupled to network 60 and a policy database 30 which stores the network policies.

Furthermore, system 1 may include a Policy Enforcement Point ("PEP") 40 (e.g., a client server) which is also coupled to network 60 and at least one particular source 50.

Source 50 may include, for example, (a) a user; (b) a device or an arrangement which is capable of communicating with network 60; (c) a third-party which is interested in using the network; and/or (d) network 60 itself. For example, the user may be an employee, a manager, an independent contractor, a consultant, etc. The device or the arrangement may be, e.g., a network server, a personal computer, a network computer, a laptop, a personal digital assistant, a further network, etc. The third-party may be, e.g., a governmental agency intending to review certain records stored on network 60. Network 60 may itself perform actions, e.g., upon detecting a predetermined parameter.

The following is an exemplary list of ways to request the particular action. The action to be provided by network 60 may be requested pro-actively by source 50 (e.g., source 50 requests a particular network access). In addition, the action may be requested "passively" (e.g., unbeknownst to source 50 and upon detecting a predetermined condition, the action may be requested on behalf of source 50).

Figure 1B:
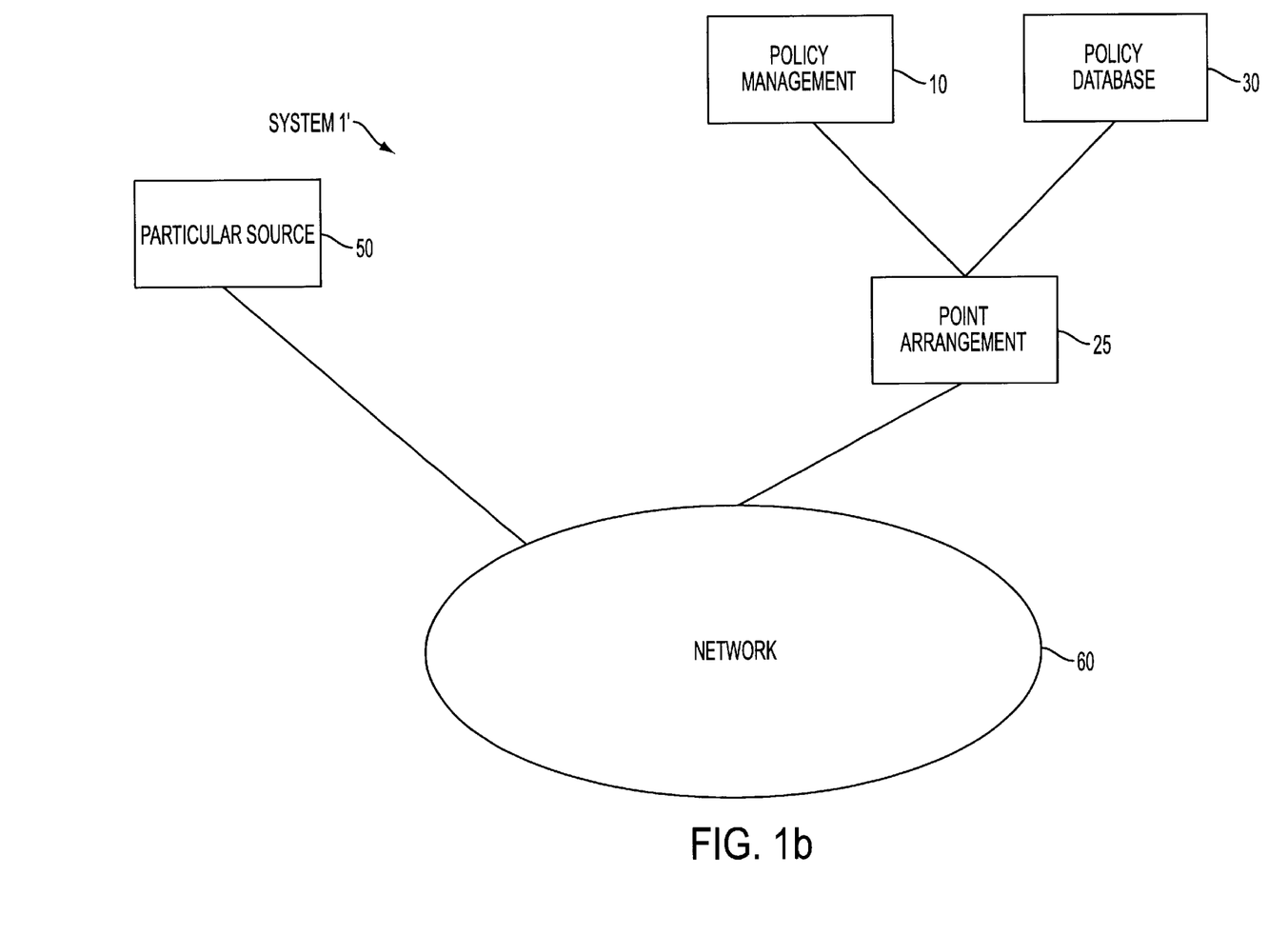
FIG. 1b shows another embodiment of the system according to the present invention.

FIG. 1b shows another embodiment of system 1 according to the present invention. In particular, system 1' is similar to system 1 described herein, except that system 1' includes a point arrangement 25. The point arrangement 25 includes PEP 40 and PDP 20 of system 1. This combination of PEP 40 and PDP 20 (i.e., point arrangement 25) allows elimination of some duplicative functions and increase performance of system 1'.

The following is a brief exemplary description of system 1. Source 50 may request a particular action of network 60 (e.g., access to a 1 Mbps (Million bits per second) access line) by submitting a request to PEP 40 which controls network 60. PEP 40 forwards the request to PDP 20 which makes a decision regarding the request. PDP 20, using policy tree 100 (described in detail below), determines if the requested action is available. If the requested action is available, then PDP 20 has to determine if source 50 is allowed/authorized to be provided with the requested action. If source 50 is authorized, the requested action is provided by PEP 40; otherwise, an appropriate message is issued by PDP 20.

Policy tree 100 may include at least two levels, e.g., a policy rule level and an action level. In addition to a two-level logical structure, policy tree 100 may utilize a three-level structure (e.g., an action type level may be provided in addition to the levels described above), a four-level structure (e.g., a condition level may be provided in addition to the three levels described above) and a five-level structure (e.g., a condition type level may be provided in addition to the four levels described above). Those skilled in the art would realize that policy tree 100 may have other numbers of levels. A number of levels may depend upon a predetermined event and may be adjusted in real-time, or periodically.

Figure 3A:
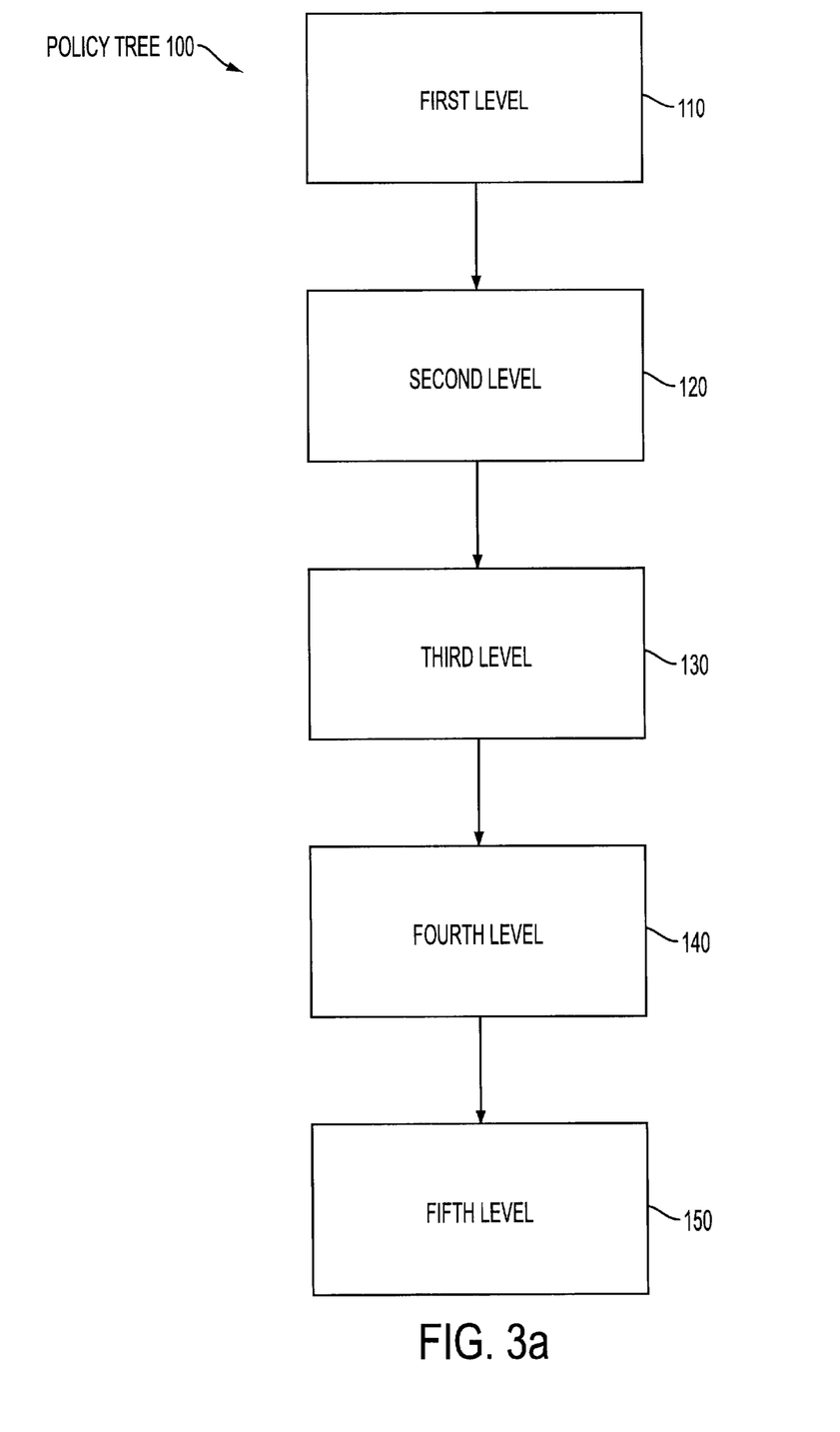
FIG. 3a shows an embodiment of a general level structure of a policy tree according to the present invention.

In a preferred embodiment of the present invention, shown in FIG. 3a, policy tree 100 may utilize, for example, a five-level logical structure. A first level 110 of policy tree 100 may include actions which are organized by type. A second level 120 includes a number of actions that can be provided by network 60. Rules of policy tree 100, which are defined as a combination of condition types, are included in a third level 130. A fourth level 140 may include set(s) of conditions which are categorized by type. Finally, a fifth level 150 may include individual conditions.

Policy tree 100 may be generated by PDP 20 based upon, e.g., network policies, particular source data, network data, etc. provided, e.g., by policy management 10. PDP 20 generates and maintains each level of policy tree 100. Policy tree 100 is stored by PDP 20 in policy database 30. PDP 20 may generate policy tree 100 by determining all available actions. Based on such actions, first and second levels 110, 120 are generated. PDP 20 then examines the network policy which is generated by policy management 10. Based on the network policy, PDP 20 generates third level 130. Subsequently, PDP 20 generates fourth and fifth levels 140, 150 as a function of third level 130. Those skilled in art will realize that policy tree 100 may be generated in a different manner than the one described above.

PDP 20 also keeps track of changes in network policies, network users, network data, etc. and adjusts policy tree 100 accordingly. PDP 20 also keeps a record of every change/adjustment to policy tree 100. Furthermore, PDP 20 may generate statistical data regarding the usage of network 60 by source 50. Such statistical data may be utilized to adjust policy tree 100, e.g., in real-time.

Figure 3B:
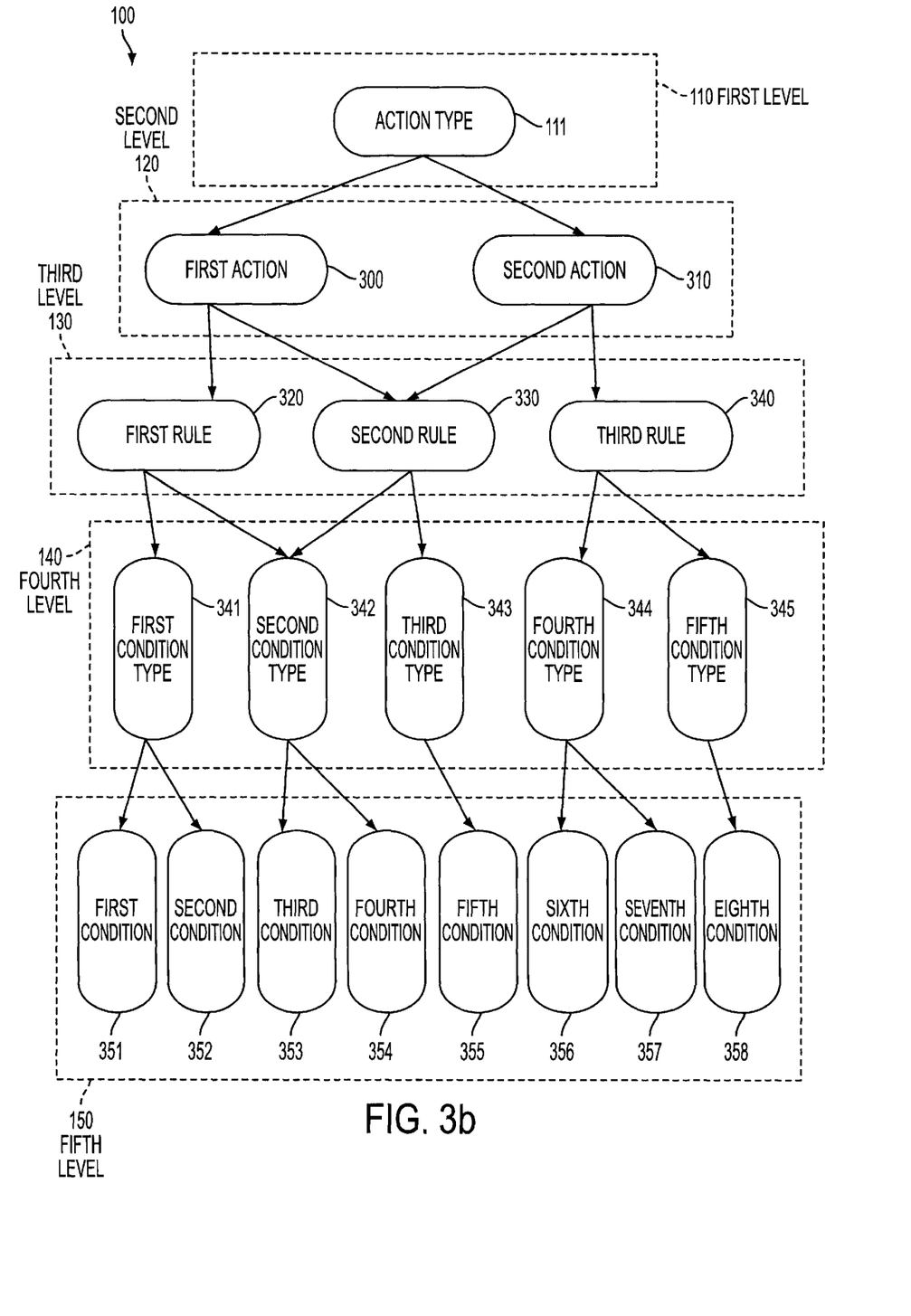
FIG. 3b shows an embodiment of a detailed structure of the policy tree.

FIG. 3b shows a detailed view of policy tree 100. In particular, first level 110 may include an action type 111. Action type 111 may be linked to one or more actions of second level 120, e.g., a first action 300 and a second action 310. As described above, the action may be, e.g., access to a physical entity (e.g., a 1 Mbps access line), access to a logical entity (e.g., an IP multicast channel), and/or another action which needs to be provided by network 60. The actions of second level 120 may be grouped into subgroup(s). The grouping may be dynamically changed depending, e.g., upon availability of a particular action.

Each action of second level 120 may have an ordering priority code. The ordering priority code indicates an order in which the particular action will be reviewed. For example, first action 300 may have a first priority code, while second action 310 may have a second priority code. Thus, when a request for the particular action is evaluated, PDP 20 first checks action 300 before checking second action 310, because first action 300 has priority code which is higher than a priority code of second action 310.

Each action of second level 120 is linked to at least one rule of third level 130. Third level 130 may include at least one policy rule which is associated with action(s) of second level 120. The policy rules may identify requirements that need to be satisfied to obtain a particular action. It should be noted that a plurality of policy rules may be associated with a single action, and vice versa. Rules may be "reused" across different actions of second level 120. The policy rules may also be grouped, in a manner similar to the actions of second level 120.

As shown in FIG. 3b, third level 130 may have three rules: a first rule 320, a second rule 330 and a third rule 340. The policy rules of third level 130 may be combined using logical connectors (e.g., policy rules may be ORed together). For instance, as shown in FIG. 3b, if source 50 desires to have first action 300 performed, then first rule 320 or second rule 330 must be satisfied.

In this embodiment, the policy rules of third level 130 are based upon predetermined criteria (i.e., types of conditions) of fourth level 140. The predetermined criteria may include, e.g., identifications, source/destination network addresses, ports, tags, time of day information, network statistical information, or any other characteristics that allow identification of source 50. Fourth level 140 may include four condition types: a first condition type 341, a second condition type 342, a third condition type 343, a fourth condition type 344 and a fifth condition type 345. Each condition type may be combined together using the logical connecters (e.g., sets of condition types may be ANDed together). For example, as shown in FIG. 3b, first rule 320 is satisfied when first condition type 341 and second condition type 342 are satisfied, while to satisfy second rule 330, second and third condition types 342, 343 must be satisfied.

Fifth level 150 of policy tree 100 may include a plurality of conditions which correspond to condition types of fourth level 140. For example, fifth level 150 may include eight conditions: a first condition 351, a second condition 352, a third condition 353, a fourth condition 354, a fifth condition 355, a sixth condition 356, a seventh condition 357 and an eighth condition 358. Each of the conditions of fifth level 150 may be combined together using the logical connecters (e.g., conditions may be logically ORed together). For example, first condition type 341 is satisfied when first condition 351 or second condition 352 is satisfied.

Figure 4A:
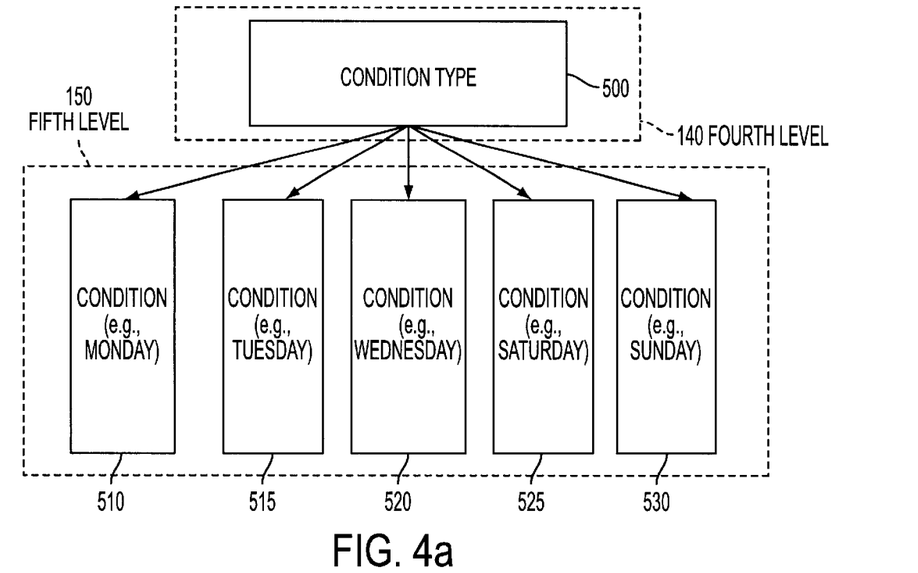
FIG. 4a shows an embodiment of forth and fifth levels of the policy tree.
Figure 4B:
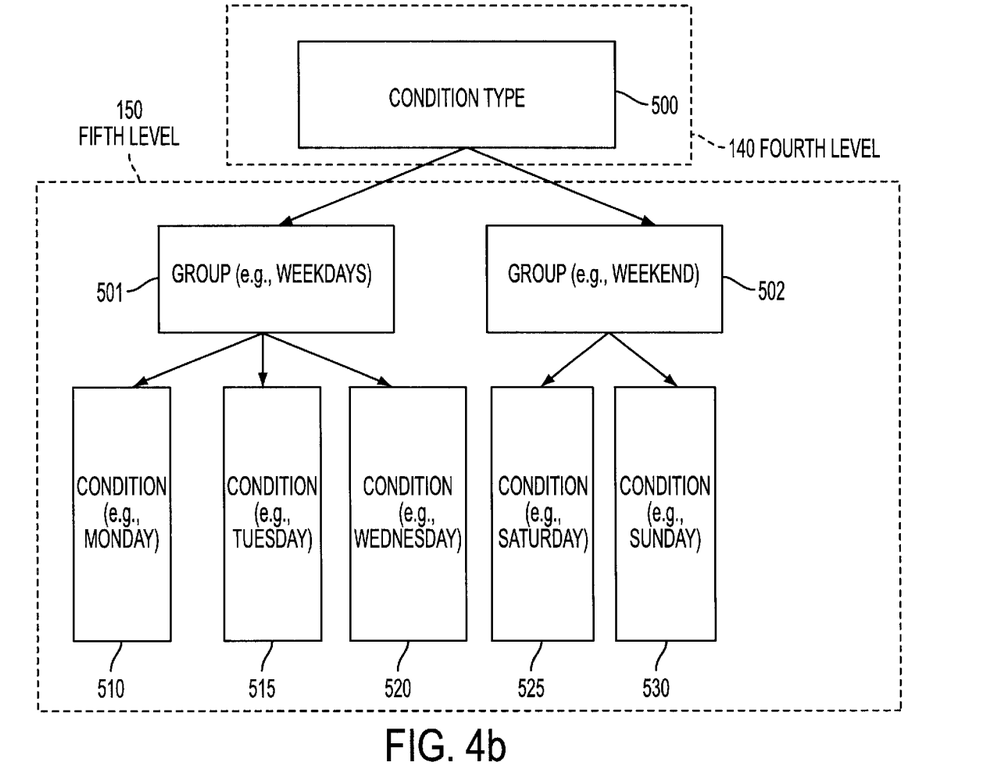

As mentioned above, the conditions of fifth level 150, as well as the actions of second level 120 and the policy rules of third level 130, may be grouped. Within each level of second, third and fifth levels 120, 130 and 150, there may be "a minitree", as shown in FIGS. 4a and 4b, which allows grouping the actions, the policy rules and/or the conditions in a predetermined manner. For example, as shown in FIG. 4a, fifth level 150 may include the following five conditions: a condition 510 (e.g., Monday), a condition 515 (e.g., Tuesday), a condition 520 (e.g., Wednesday), a condition 525 (e.g., Saturday) and a condition 530 (e.g., Sunday) which are linked with a condition type 500 (e.g., Days) of fourth level 140. As shown in FIG. 4b, such conditions 510–530 may be grouped into two groups: a group 501 (e.g., Weekdays) and a group 502 (e.g., Weekend). Group 501 may include conditions 510–520, while group 502 may include conditions 525–530. Both groups 501, 502 are linked to condition type 500 of fourth level 140. There are no limitations on the number of such groupings. In addition, such grouping may be generated, adjusted or completely deleted, e.g., in real time, in predetermined time periods, upon a predetermined event, etc.

Figure 2:
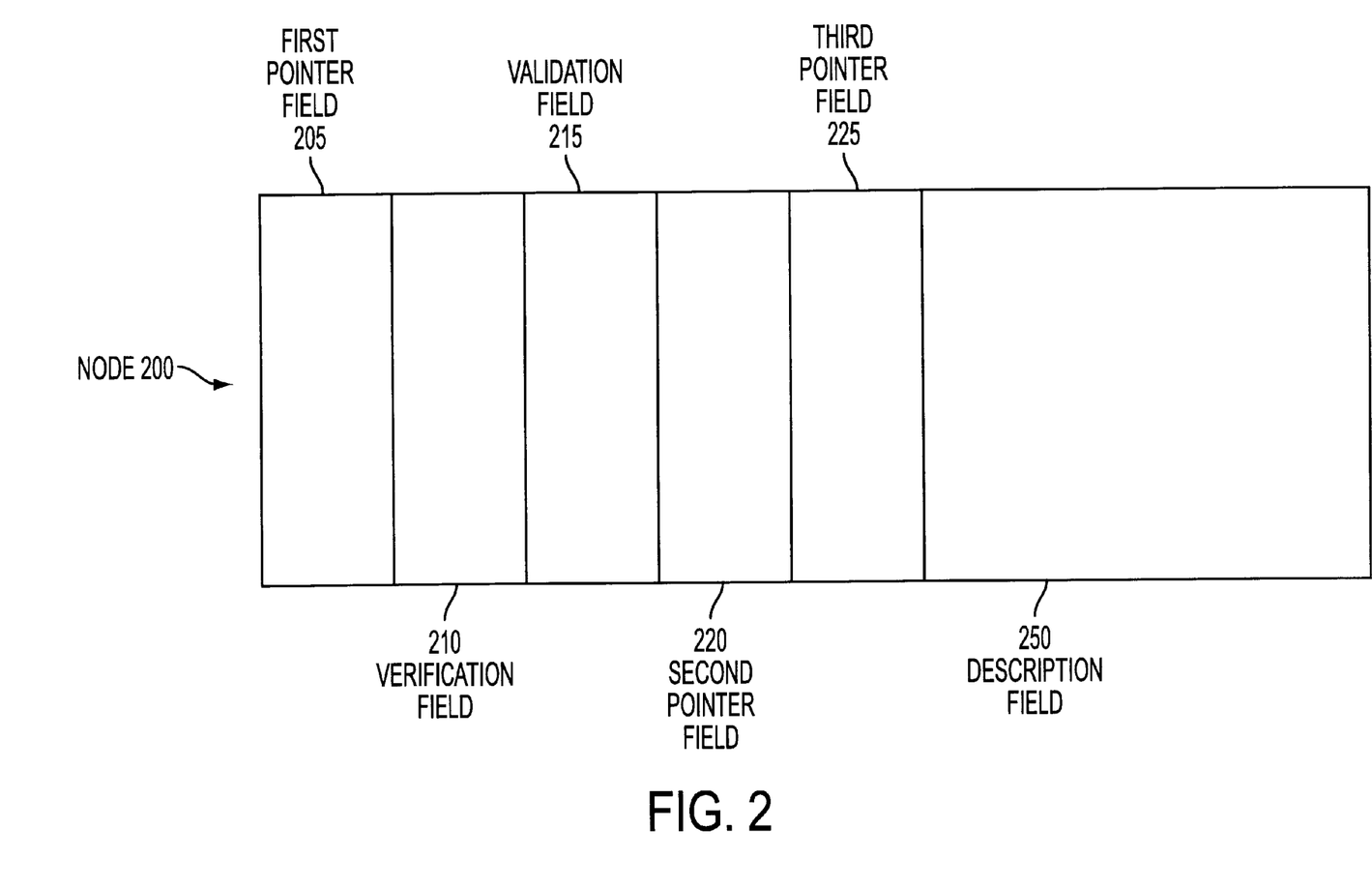
FIG. 2 shows an embodiment of a node according to the present invention.

Each element of policy tree 100 (e.g., an action and a rule) may be represented as a node structure. FIG. 2 shows an embodiment of a node 200 which includes a plurality of fields. Node 200 may include a description field 250 which includes a description of an element of policy tree 100 (e.g., a video conference access line). In addition, node 200 may include a first pointer field 205 which has a pointer to another node 200 of a following level (e.g., node 200 of first level 110 would point to at least one node 200 of second level 120). If first pointer field 205 points to a plurality of nodes 200 of the following level, then first pointer field 205 would also include at least one first-order logical connector (e.g., OR, AND, NOT, etc.) which combines the pointers. For example, the policy rules of third level 130, as well as conditions of fifth level 150, may be logically ORed together. Condition types of fourth level 140 may be logically ANDed together.

Furthermore, node 200 may include a verification field 210 which indicates if node 200 was verified (i.e., checked) by PDP 20. Verification field 210 of each node 200 is set to "0", as a default, each time the policy tree is searched. "0" indicates that node 200 was not verified. When node 200 is checked, verification field 210 is set to "1". Node 200 may also include a validation field 215 which indicates if node 200 is valid or invalid. When policy tree 100 is searched, validation field 215 of each node 200 is set, as a default, to "0" to indicate that node 200 is not valid. When node 200 is determined to be valid, validation field 215 may be set to "1".

Those skilled in the art would understand that other embodiments of node 200 are available in view of the above description. For instance, in an alternative embodiment of the present invention, node 200, which is utilized for the above-described grouping of elements of second, third and fifth levels 120, 130 and 150, may include a second pointer field 220. Second pointer field 220 may point to at least one preceding node 200 of the same level. Furthermore, node 200 may include a third pointer field 225 which may point to at least one following node of the same level. Second and third pointer fields 220, 225 allow searching of policy tree 100 not only from the top of policy tree 100 to its bottom, but also from the bottom to the top.

Figure 3C:
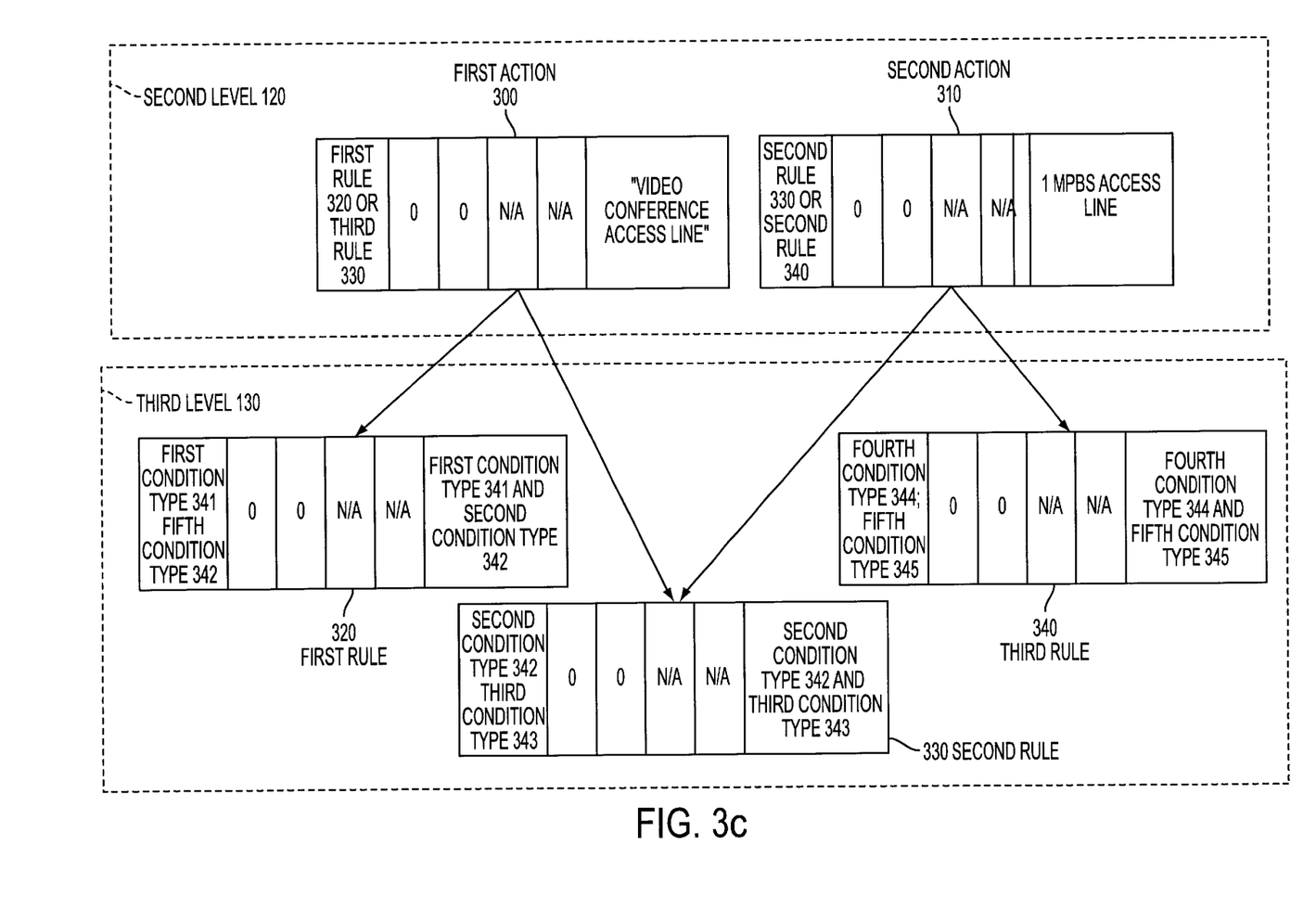
FIG. 3c shows an embodiment of a detailed structure of second and third levels of the policy tree.

FIG. 3c shows, for illustration purposes, only two levels of policy tree 100: second and third levels 120, 130 using the node structure. Second level 120 includes first action 300 (e.g., access to a video conference access line) and second action 310 (e.g., access to 1 Mbps access line). Actions 300, 310 of second level 120 may correspond to at least one rule of second level 120. For instance, first action 300 may be governed by first rule 320 or second rule 330 (i.e., in order for first action 300 to be provided, only one first rule 320 or third rule 330 must be satisfied), while second action 310 may be governed by second rule 330 or third rule 340. Third level 130 includes, e.g., first rule 320, second rule 330 and third rule 340. Each of policy rules 320–340 includes pointer(s) to at least one condition type of fourth level 140 (not shown in FIG. 3c) which is stored in first pointer field 205 of the corresponding policy rule. For example, first rule 320 may include the following condition: "IF first condition type 341 AND second condition type 342 are satisfied THEN the requested action may be provided." Second rule 330 is satisfied only if second and third condition types 342, 343 are satisfied. Third rule 340, on the other hand, is satisfied only if fourth and fifth condition types 344, 345 are satisfied.

Policy tree 100 may be changed dynamically (e.g., in real time), periodically and/or as a function of a predetermined condition. A particular node 200 may be added, deleted and/or updated to any level of policy tree 100. For instance, node 200 may be added to second level 120 when a particular action is added to network 60. Similarly, node 200 of second level 120 may be removed and/or updated if a particular action is removed from network 60 and/or temporarily unavailable. Similarly, node 200 may be added to third level 130 if policy management 10 decides to create another policy rule.

If a particular action is not available, it is possible to determine if a further action, which is similar to the particular action, can be provided to source 50. Similarity between the further action and the particular action is determined by policy management 10. For example, if source 50 requests a 10 Mbps secure access line, but source 50 is not authorized to use such an access line or this action is unavailable, policy tree 100 may determine a further action (e.g., access to a 1 Mbps secure access line) is available and authorized to be utilized by source 50.

Such a policy tree 100 allows to better implementation of policy management of network 60. In particular, the policy rules and the actions may be expressed and implemented using an "IF THEN" structure (or any other logical structure which allows similar results to be achieved, e.g., CASE and SELECT structures). For example, IF the user is manager A, THEN allow the user to use the fastest available access line ELSE allow the user to use the second fastest access line. The "IF THEN" structure may be nested (e.g., "IF THEN" structure including at least one further "IF THEN" structure within itself). For example, IF the user is not manager THEN (IF the user is a group A employee THEN provide B-quality service). In addition, the "IF THEN" structure may have the following structure, e.g., IF <condition 1> THEN <action 1> ELSE (IF <condition 2> THEN <action 2> ELSE [IF <condition 3> THEN <action 3>]).

Figure 5:
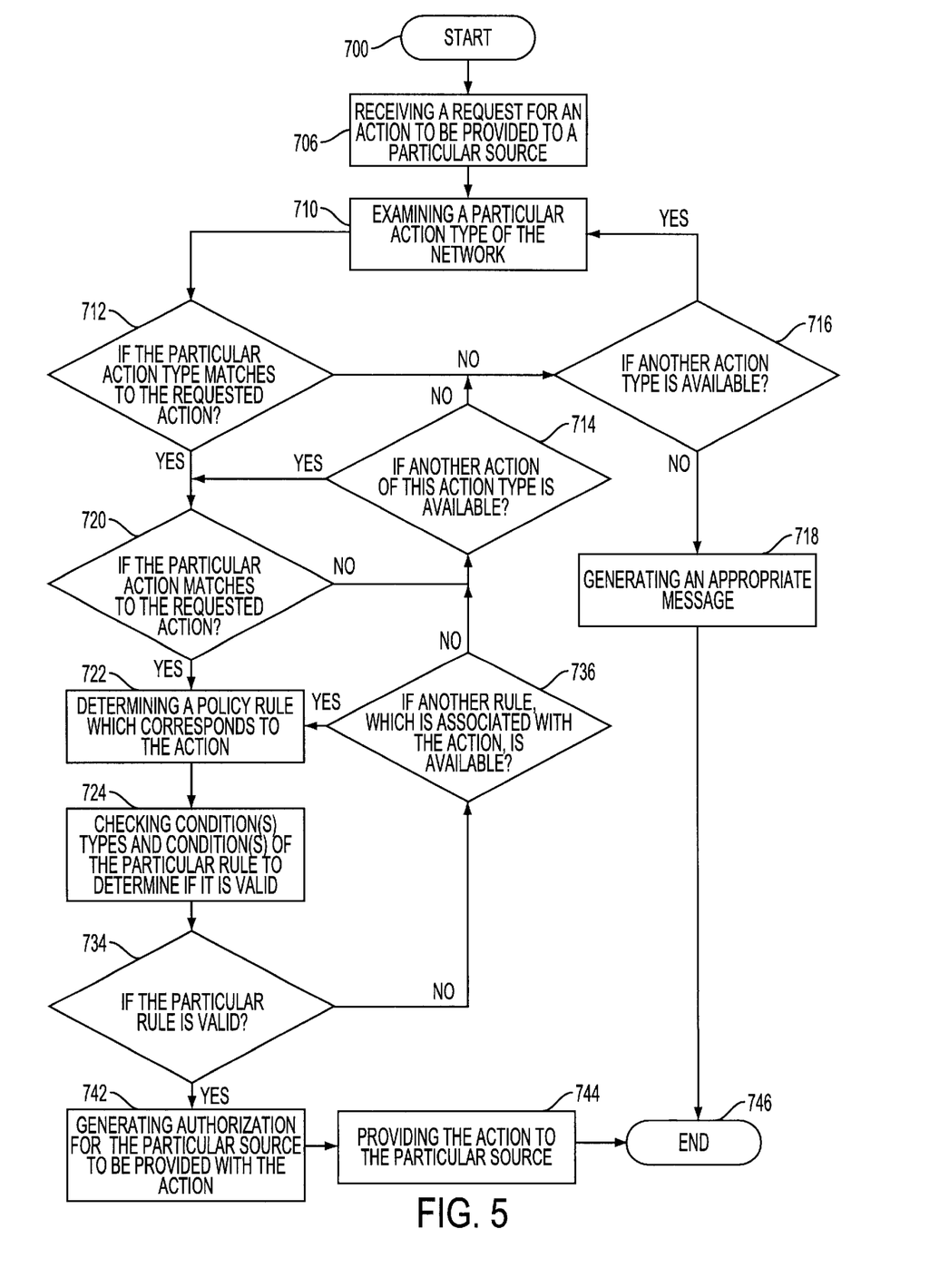
FIG. 5 shows an embodiment of a method according to the present invention.

FIG. 5 shows an embodiment of the method according to the present invention which includes, e.g., two phases: a first phase and a second phase. The first phase begins with PDP 20 receiving a particular request for an action from source 50 (step 706). PDP 20 then has to determine if the requested action is available to be provided to source 50. PDP 20 checks a particular action type of first level 110 (step 710) to determine whether description field 250 of the requested action is included within the description of the particular action type (step 712). For example, if the requested action is an "access to a 10 Mpbs line" and the particular action type is "access lines", then PDP 20 may generate a match.

If no match is generated, then PDP 20 has to check if first level 100 has another action type available (step 716). If another action type is available, then PDP 20 performs steps 710–716 until there is a match; otherwise, an appropriate message is generated and transmitted to source 50 (step 718).

If there is a match between the particular action type of first level 110 and the requested action, then PDP 20 has to determine if the particular action type is linked to a particular action of second level 120 which has a description matching the description of the requested action (step 720). The actions of second level 120 may be checked in accordance with their respective priority code. Thus, if an action with the highest priority code does not match the requested action (step 714), then another action of second level 120 with the second highest priority code is checked.

If the requested action is available, then PDP 20 may initiate the second phase of the method. PDP 20 has to determine if the particular action may be provided to source 50. The particular action (e.g., which corresponds to the requested action) may be provided only to source 50 who is authorized under a particular rule of third level 130 which is associated with the particular action (i.e., the particular rule must be valid). A pointer to the particular rule is included in first pointer field 205 of the particular action. The particular rule may include at least one condition type of fourth level 140 which must be satisfied for the particular rule to be valid.

PDP 20 finds a particular policy rule of third level 130 (step 722). Then, PDP 20 checks each condition type of the particular rule to determine its validity (step 724). Validity of each condition type of fourth level 140 is determined as a function of validity of each of corresponding condition of fifth level 150. After checking the condition(s) of the particular condition type, PDP 20 evaluates the particular rule and determines if it is valid (step 734).

If the particular rule is invalid, then PDP 20 has to determine if another policy rule that is associated with the particular action is available (step 736). If it is available, then PDP 20 may evaluate that rule (step 722).

If there are no rules associated with the particular action, then PDP 20 has to determine if there is another action (step 714). If at least one rule is available, the PDP 20 repeats the method starting with step 710; otherwise, the PDP 20 generates and transmits an appropriate message (step 718). The appropriate message may include information explaining why the particular action is not available and/or not authorized and suggests possible alternatives to the particular action. Consequently, source 50, e.g., may decide to wait until the requested action is available or obtain a higher priority classification from policy management 10.

If the particular rule is valid, then source 50 is authorized to access the particular action, and the authorization is provided to PEP 40 (step 742). The particular action may be provided to the source 50 (step 744).

In an alternative embodiment, if the requested action is not available, the PDP 20 may find a closest available action and determine whether such an action would be acceptable to source 50. Source 50 may also request a particular group and/or a range of particular actions and/or groups. In such a case, PDP 20 may determine a list of available actions and/or groups which can be provided. Source 50 then picks an action from the list.

In an alternative embodiment according to the present invention, policy rules may be in effect only when predetermined condition(s) occur(s). For example, first rule 320 is not applicable to first action 300 between 10 pm and 11 pm.

In another alternative embodiment according to the present invention, source 50 may submit a reservation request for a currently unavailable action. In addition, source 50 may submit a request which specifies when the action is needed. Reservations of actions may be based on a predetermined priority level of source 50 or a predetermined priority of a particular task for which the action is requested.

Policy tree 100 may also be stored in a memory storage device of PEP 40 to facilitate expeditious policy evaluation. In such a case, PDP 20 would not evaluate a particular request for an action since such evaluation is done locally by PEP 40.

An advantage of the present invention is that it provides for a comprehensive framework for the specification, configuration, administration and enforcement of policies related to the use of system or network actions/services such as a multicast access, a bandwidth allocation, a firewall security, etc. The present invention may allow a system and network administrator to exercise control over the providing of actions based on a particular source's attributes, time-of-day, group memberships, and source/destination networks/hosts, applications, etc. Generally stated, the present invention may provide a comprehensive management control over the use of network actions, i.e., to facilitate the specification, configuration, monitoring, and enforcement of policies related to requests for access to and reservation of actions in the network.

Policy tree 100 may be advantageously utilized to produce a logically consistent (i.e., unambiguous) policy. As described above policy tree 100 may have an ability to exclude (i.e., use a logical NOT expression). For instance, policy tree 100 may have the following:

IF employee THEN "medium" access rights;

IF manager THEN "good" access rights;

IF CEO THEN "excellent" access right.

The above statements may be considered ambiguous, because the manager is also an employee and the CEO is a manager and an employee. The logically consistent (unambiguous) policy may have the following:

IF employee AND NOT CEO AND NOT manager THEN "medium" access rights;

IF manager AND NOT CEO THEN "good" access rights;

IF CEO THEN "excellent" access rights.

The above mentioned logically consistent policy may be achieved using "IF THEN ELSE" statements, where the CEO's policies may be checked first, the managerial policies may be checked second and the employee's policies may be checked third.

In addition, the present invention may support existing paradigms of network management. In particular, system 1 may include a support for a centralized console (or a point of control) and allow for a hierarchy of such controllers corresponding to the existing network management hierarchy.

Another advantage of the present invention is that it may facilitate avoidance of a process overload at network devices by outsourcing network policy-related processes to external entities that are less performance-sensitive. Outsourcing of network policy processes to external entities also encourages efficient division of labor. The network device need support only a small policy enforcement component, while all the knowledge relative to policy configuration and interpretation may be stored on policy database 30, obviating the need to maintain a replicated database across multiple network devices.

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A method comprising:
   providing a policy-tree in a database, said policy tree to be used to manage a network and comprising a plurality of levels;
   receiving a request for an action to be provided by the network to a particular source;
   determining whether the action is available as a function of at least one level of the plurality of levels;
   determining whether the particular source is authorized to be provided with the action as a function of at least one rule of at least one further level of the plurality of levels, the at least one further level comprising a third level generated as a function of the at least one rule, a fourth level generated as a function of at least one condition type of the at least one rule, the fourth level being linked to the third level, a fifth level generated as a function of at least one condition of the at least one condition type, the fifth level being linked to the fourth level, if the action is available; and
   providing the action to the particular source, if the particular source is authorized.

2. The method according to claim 1, wherein the particular source comprises at least one of an arrangement, a device, a further network, a third-party user, and a user.

3. The method according to claim 1, wherein the action comprises at least one of access to a physical resource and access to a logical resource.

4. The method according to claim 1, wherein the at least one level comprises a first level and a second level, the first level being generated as a function of an action type, the action type being indicative of the action, the second level being generated as a function of the action, the second level being linked to the first level.

5. The method according to claim 1, wherein the receiving a request for an action comprises:
   submitting the request for the action to be provided to the particular source by at least one of the particular source, the network and a third-party.

6. The method according to claim 5, wherein the request is submitted upon detecting a predetermined parameter.

7. The method according to claim 1, further comprising:
   determining data which are indicative of availability of the action, if the action is unavailable.

8. The method according to claim 1, further comprising:
   determining a further action of the second level which is similar to the action according to a predetermined criteria, if the action is unavailable.

9. A method comprising:
   generating a first level of a policy tree in a database to be used to manage a network as a function of an action type, the action type being indicative of an action of the network;
   generating a second level of the policy tree in the database as a function of the action, the second level being linked to the first level and being indicative of an availability of the action;
   generating a third level of the policy tree in the database as a function of at least one rule of the network, the at least one rule allowing a determination of whether a particular source of the network is authorized to be provided with the action;
   generating a fourth level of the policy tree in the database as a function of at least one condition type of the at least one rule, the fourth level being linked to the third level; and
   generating a fifth level of the policy tree in the database as a function of at least one condition of the at least one condition type, the fifth level being linked to the fourth level.

10. The method according to claim 9, further comprising:
    modifying the first level and the second level as a function of a predetermined parameter.

11. The method according to claim 9, further comprising:
    modifying at least one of the third, fourth and fifth levels as a function of a further predetermined parameter.

12. The method according to claim 11, wherein the further predetermined parameter comprises at least one of an addition of a further rule to the network, a removal of the at least one rule from the network, and a modification of the at least one rule.

13. The method according to claim 9, further comprising:
    grouping actions of the second level into at least one group in a predetermined manner.

14. The method according to claim 9, further comprising:
    grouping the at least one rule of the third level into at least one group in a predetermined manner.

15. The method according to claim 14, wherein the at least one rule group corresponds to the at least one action.

16. The method according to claim 9, further comprising:
    grouping the at least one condition of the fifth level into at least one group in a predetermined manner.

17. The method according to claim 9, further comprising:
    updating the policy tree in real time.

18. The method according to claim 9, further comprising:
    updating the policy tree according to a predetermined time schedule.

19. The method according to claim 9, wherein the action comprises at least one of access to a logical entity and access to a physical entity.

20. The method according to claim 9, wherein the action corresponds to the at least one rule.

21. The method according to claim 9, wherein the at least one rule corresponds to the action.

22. The method according to claim 9, wherein the action corresponds to a particular rule of the at least one rule, if a predetermined condition is satisfied.

23. A system comprising:

an arrangement comprising a memory device and a processor, the memory device to store a policy tree to be used to manage a network, the policy tree comprising at least one level and at least one further level, the at least one level comprising at least one action of the network, the at least one further level comprising at least one rule, a third level being indicative of the at least one rule, a fourth level being indicative of at least one condition type of the at least one rule, the fourth level being linked to the third level, a fifth level being indicative of at least one condition of the at least one condition type, the fifth level being linked to the fourth level, the arrangement to receive a request for an action to be provided to a particular source, the processor to determine whether the action is available as a function of the at least one level, the processor to determine whether the particular source is authorized to be provided with the action as a function of the at least one rule, the at least one rule corresponding to the action, if the action is available, and the arrangement to provide the action to the particular source, if the particular source is authorized.

24. The system according to claim 23, wherein the network comprises at least one of an internet, a local area network, a wide area network, a virtual network, and a wireless network.

25. The system according to claim 23, wherein the particular source comprises at least one of a user and a computing device.

26. The system according to claim 23, wherein the policy tree is updated in real time.

27. The system according to claim 23, wherein the at least one level comprises a first level and a second level, the first level being indicative of an action type of the at least one action, the second level being indicative of the action, the second level being linked to the first level.

28. A system comprising:

a source comprising at least one of a user and a computing device;

a policy server to generate and store in a database at least one level of a policy tree as a function at least one action of the network and at least one further level of the policy tree as a function of at least one rule, the at least one rule corresponding to the at least one action, the policy tree to be used to manage a network; and the at least one further level comprising a third level being indicative of the at least one rule, a fourth level being indicative of at least one condition type of the at least one rule, the fourth level being linked to the third level, a fifth level being indicative of at least one condition of the at least one condition type, the fifth level being linked to the fourth level, a client server to receive a request for a particular action to be provided by the network to the source and to communicate the request to the policy server, the policy server to determine, using the at least one level, whether the particular action is available, the policy server to determine, using the at least one rule, if whether the source is authorized to be provided with the particular action, if the action is available, and the policy server to communicate such authorization to the client server that is capable of providing the particular action to the source, if the source is authorized.

29. A machine-readable storage medium having stored thereon a set of executable instructions for performing a method comprising:

providing a policy tree in a database to be used to manage actions provided by a network the policy tree comprising a plurality of levels;

receiving a request to provide an action by the network to a particular source, determining whether the action is available as a function of at least one level of the plurality of levels, determining whether the particular source is authorized to be provided with the action as a function of at least one rule of at least one further level of the plurality of levels, the at least one further level comprising a third level being indicative of the at least one rule, a fourth level being indicative of at least one condition type of the at least one rule, the fourth level being linked to the third level, a fifth level being indicative of at least one condition of the at least one condition type, the fifth level being linked to the fourth level, if the action is available, and providing the action to the particular source, if the particular source is authorized.

* * * * *